(12) United States Patent
Christie, IV

(10) Patent No.: US 7,369,539 B1
(45) Date of Patent: May 6, 2008

(54) SYSTEM AND METHOD FOR PROVIDING SERVICE CONTROL TO A SINGLE TELEPHONE END TERMINAL FROM MULTIPLE SERVICE PROVIDERS

(75) Inventor: Samuel H. Christie, IV, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 1040 days.

(21) Appl. No.: 10/411,162

(22) Filed: Apr. 10, 2003

Related U.S. Application Data

(63) Continuation of application No. 09/249,051, filed on Feb. 12, 1999, now Pat. No. 6,657,992.

(51) Int. Cl.
*H04L 12/66* (2006.01)
(52) U.S. Cl. .................. 370/352; 370/389; 370/401
(58) Field of Classification Search .............. None
See application file for complete search history.

(56) References Cited

U.S. PATENT DOCUMENTS

| | | | |
|---|---|---|---|
| 5,867,494 A | 2/1999 | Krishnaswamy et al. ... | 370/352 |
| 6,240,449 B1 | 5/2001 | Nadeau | |
| 6,374,302 B1 | 4/2002 | Galasso et al. ........... | 709/238 |
| 6,519,249 B1 | 2/2003 | Bennefeld et al. | |
| 6,614,784 B1 * | 9/2003 | Glitho et al. .............. | 370/352 |

| | | |
|---|---|---|
| 2001/0046209 A1 | 11/2001 | Glassman |

OTHER PUBLICATIONS

Holmes et al, IMis-Ericsson Report, Norwegian Computing Center/Applied Research and Development, pp. 1-102; May 1998.*
Handley, Schulzrinne et al., "SIP: Session Initiaion Protocol," MMUSIC, WG, Mar. 1999.
Thom, "H.323: The Multimedia Communication sStandard for Local Area Networks," IEEE, pp. 52-56, Dec. 1998.
Rosenberg et al., "Internet Telephony Gateway Location," IEEE, pp. 488-496, 1998.
Beijar, "Signaling Protocols for Internet Telephony: Architectures Based on H.323 and SIP," Helsinki University of Technology, pp. 1-54, Oct. 20, 1998.

* cited by examiner

*Primary Examiner*—Frank Duong
(74) *Attorney, Agent, or Firm*—Withrow & Terranova, PLLC

(57) ABSTRACT

A system and method of using multiple service providers to provide subscriber services on a per call basis achieved by using H.323 capability in a gatekeeper to identify call signaling transfer addresses used for each call. Service subscription data is based on the address or alias being used to place or receive a call. Since telephones can have the ability to register multiple addresses simultaneously, the same phone can receive service from multiple providers simultaneously. In addition, it is possible that some of the addresses or aliases used may be part of a private address space such as, for instance, a private branch exchange (PBX) system. This would enable service from a provider that is not a registered public telephone service provider.

22 Claims, 4 Drawing Sheets

SYSTEM AND METHOD FOR PROVIDING SERVICE CONTROL TO A SINGLE TELEPHONE END TERMINAL FROM MULTIPLE SERVICE PROVIDERS

REFERENCE TO RELATED APPLICATIONS

The present application is a continuation of U.S. patent application Ser. No. 09/249,051, filed Feb. 12, 1999, now U.S. Pat. No. 6,657,992.

FIELD OF THE INVENTION

The present invention relates to service provision for IP telephony network systems and subscribers to such systems. More specifically, the present invention relates to providing for multiple service providers per subscriber on a single IP telephony network system.

BACKGROUND OF THE INVENTION

In current telephone networks, users receive service from a single, licensed monopoly telephone company service provider. This structure is primarily enforced through a physical association between the copper loop that provides network access and the telephone company's switching equipment. The present invention utilizes an IP network capable of supporting multiple service providers and their service offerings from a single terminal or access infrastructure.

The Telecom Reform Act of 1996 resulted in a government mandate to "unbundle" services within the telephone network. Multiple unbundling points were identified and defined including the copper loop interface at the main distribution frame in the central office and T1 channel bank or TR-303 systems. This gives competing telephone companies a means for providing services to subscribers using the monopoly telephone company's existing loop plant. The competing telephone companies achieve this by "swinging" lines (rewiring) to their equipment.

This solution has several shortcomings, however. It is subject to line scale granularity meaning the entire phone service for the local loop moves at once. Moving a line requires manual intervention in order to physically rewire connections. This can be prohibitively expensive, especially since it requires explicit cooperation from the incumbent telephone company. Moreover, service access is limited to those firms which are registered local exchange telephone companies.

SUMMARY OF THE INVENTION

Currently, in H.323 processing the zone manager and service control unit (SCU) is a single undivided concept. The present invention promotes the idea of having more than one service provider serving a single subscriber. This is done by splitting the zone manager and SCU into separate concepts allowing for an unrelated, even dynamic, allocation of an SCU to a zone.

By using H.323 capability in a gatekeeper to identify call signaling transfer addresses used for each call, subscriber services can theoretically be provided by different service providers on a per call basis. For example, one subscriber service can be provided by a first service provider while a second subscriber service may be provided by a second service provider, and so on. In practice, service subscription data is based on the address or alias being used to place or receive a call. Since IP telephones can have the ability to register multiple aliases simultaneously, the same phone can receive service from multiple providers simultaneously. In addition, it is possible that some of the aliases used may be part of a private address space such as, for instance, a private branch exchange (PBX) system. This would enable service from a provider that is not a registered public telephone service provider for work-at-home and telecommuting subscribers.

Other aspects and features of the present invention will become apparent to those ordinarily skilled in the art upon review of the following description of specific embodiments of the invention in conjunction with the accompanying figures.

DETAILED DISCLOSURE OF THE EMBODIMENTS

The present invention is chiefly described in terms of its preferred embodiment, namely, an H.323 Internet protocol (IP) network implementation. However, other embodiments may be utilized such as, for instance, a wireless network or Session Initiation Protocol (SIP) network, without departing from the spirit or scope of the present invention.

Figure 1:
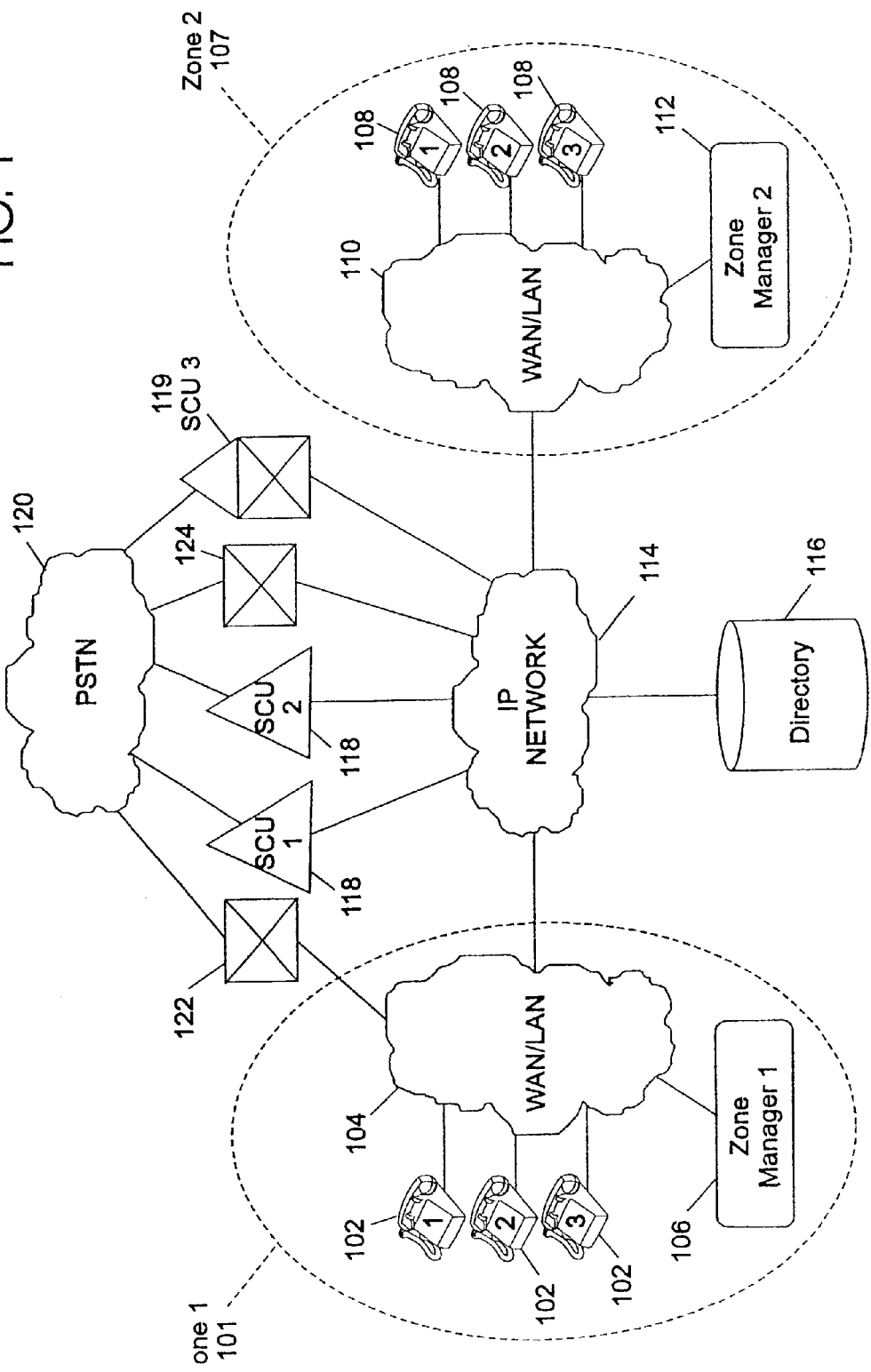
FIG. 1 illustrates one potential IP network architecture for carrying out the present invention.

FIG. 1 illustrates one potential IP network architecture implementing the present invention. A first zone 101 is comprised of a plurality of terminals or clients 102 connected to a computer network 104 such as, for instance, a local area network (LAN) or a wide area network (WAN) which is serviced by a first zone manager 106. The terms "client" and "terminal" are used interchangeably throughout this description. Similarly, a second zone 107 is also comprised of a plurality of terminals or clients 108 connected to a computer network 110 such as, for instance, a local area network (LAN) or a wide area network (WAN) which is serviced by a second zone manager 112. The zone managers are responsible for managing the registration state information of the terminals under their domain. Although not illustrated, there may be further zones in the system. Each of the zones has a physical link from its computer network (WAN/LAN) to a larger IP network 114. IP network 114, in turn, is communicable with a directory 116 and a plurality of different service providers in the form of service control units (SCUs) 118.

An SCU can also possess switching ability creating an integrated intelligent signaling gateway, call agent, and/or media gateway 119. Or, an SCU may be a private branch exchange (PBX) 122 or Central Office (CO) switch 124 with an internal gateway. Gateway 122 is controlled by SCU 1 and gateway 124 is controlled by SCU 2 in FIG. 1. A PBX or CO is a collection of gateways and an SCU in this model. The SCU nodes 118, 119 are also linked to the public switching telephone network (PSTN) 120. It is to be understood that equivalents of each node may be substituted without departing from the spirit or scope of the present invention. For example, in a wireless network a home location register (HLR) performs the same functions as the directory 116.

Individual clients or terminals in each zone are able to communicate with one another over the IP network. The various parameters controlling services and their associated service provider (SCU) addresses are contained in a subscriber profile stored within the directory 116. Thus, whenever an incoming or outgoing call commences, network logic accesses the subscriber's zone manager 106 and determines which service provider, i.e., SCU address, is responsible for providing that particular service to the subscriber. Zone manager 106 obtains a copy of the registration data (including the SCU address to use for a given service) from the directory during the registration process. The relevant service data is then gathered and exchanged via a sequence of messages. How the call is connected is based on the relevant service data.

If a wireless implementation is utilized then the directory would be substituted with a home location register (HLR) and the zone manager would be substituted with a visitor's location register (VLR). A more complete description of a wireless implementation is contained in co-pending application Ser. No. 09/280,152 entitled "System, Method, And Computer Program Product For Connectivity Of Wireless Base Station To PSTN Via An IP Data Network", the entire contents of which are incorporation herein by reference.

If a Session Initiation Protocol (SIP) implementation is utilized then SIP proxy servers would be substituted for the zone manager and SCU nodes.

Services available to telephony subscribers are numerous. The table below illustrates a sampling of services that are offered. Subscribers, via the present invention, have the ability to have multiple different service providers provide their services. It is to be understood that the following table is not intended to be a complete listing of all available services, rather an illustrative sampling of same.

TABLE I

CALLING SERVICE

CALL FORWARDING NO RESPONSE
CALLING NUMBER DELIVERY/BLOCKING
CLOSED USER GROUP
LOCAL NUMBER PORTABILITY
CONNECTED NUMBER DELIVERY/BLOCKING
EMERGENCY CALL
MALICIOUS CALL TRACE
CALL MONITORING
RELEASE LINE TRUNK
ACCOUNT CODE
EXTENSION SERVICES
MULTIPARTY
CALLING NAME DELIVERY
800 QUERY
IN SERVICE SWITCHING AND RESOURCE FUNCTIONS
HOLD AND RETRIEVE
CALL SCREENING
CALL TRANSFER
CALL FORWARDING
CALL WAITING
CALL RETURN
REPEAT DIALING
SPEED DIALING

Figure 2:
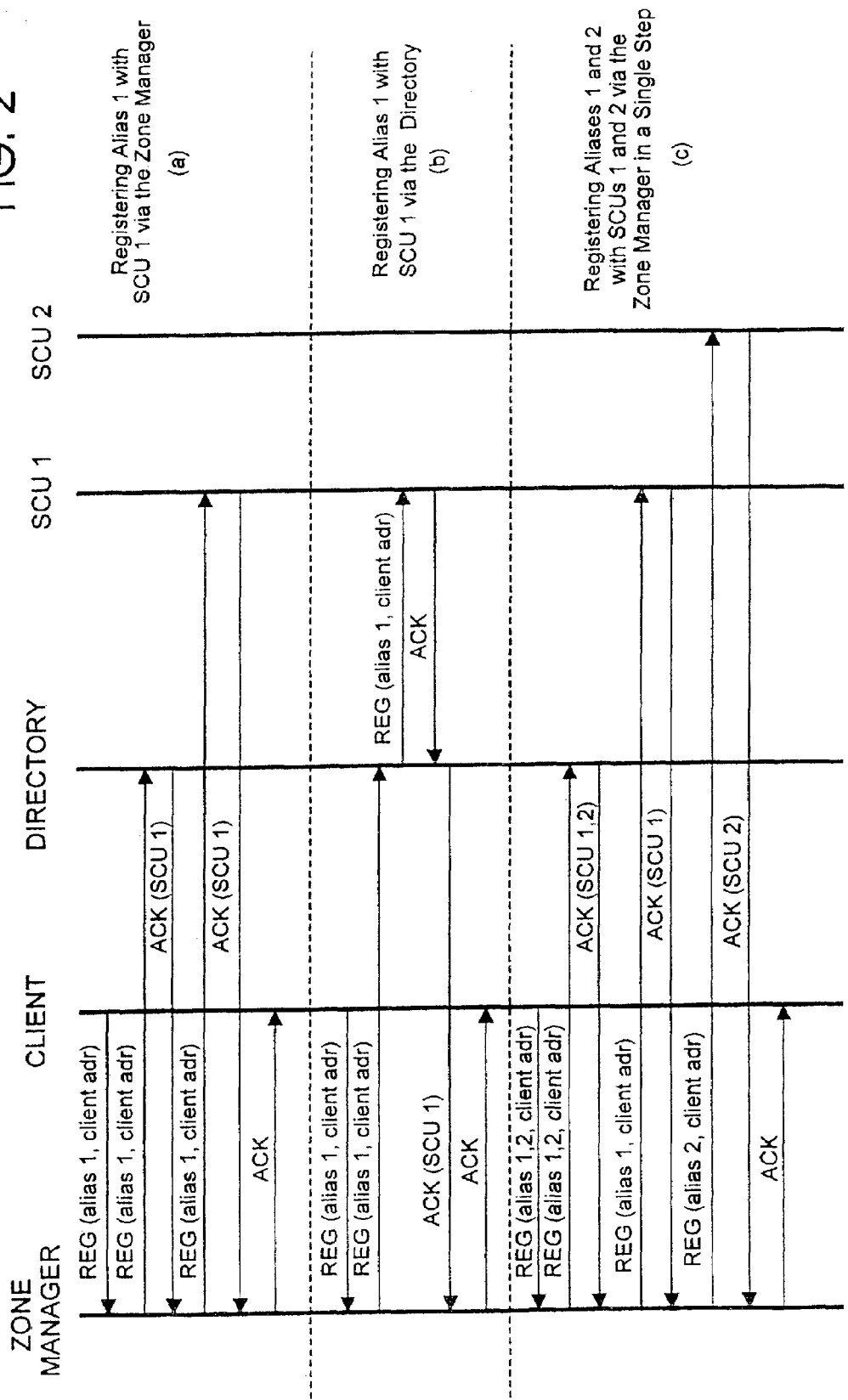
FIG. 2 is a message sequence chart illustrating the registration process of the present invention.

FIG. 2 is a message sequence chart illustrating the registration process of the present invention in an IP network environment. All messages have been defined using the H.323 protocol. However, other protocols such as SIP, for instance, may be utilized without departing from the spirit or scope of the present invention. The registration process is necessary for each client/terminal address pair, i.e. for each alias supported at each terminal. Thus, when a client registers, the client is registering with all the SCUs that can potentially provide a service to the aliases of that client. FIG. 2 is illustrative of how registration messaging occurs on a per SCU basis. While only two SCUs have been shown, it is understood that an identical registration process occurs for each potentially serving SCU. Initially, the client sends a registration message to its serving zone manager. The zone manager address is determined using the mechanisms defined in the H.323 protocol for gatekeeper discovery. One of the parameters of the registration message is the alias, e.g., directory number (DN), of the terminal. Since it is possible for a client to support multiple aliases, it is necessary for the client to specify which aliases are being registered. Another parameter in the registration message is the client address. The zone manager then sends the registration message to the directory. The directory maintains the subscriber's service profile data and is responsible for determining which SCU will process the call based on the alias in question. In this example, SCU 1 is the responsible SCU. At this point the system may register the alias with that SCU in one of two alternative ways.

The sequence in FIG. 2 labeled "a" can be termed zone manager registration of an alias since the zone manager sends the registration message to the SCUs. A registration message containing the alias and client address of the terminal is sent from the client to the zone manager when the terminal is turned on. The zone manager then sends the registration message to the directory. In this scenario, an acknowledgment message is sent from the directory back to the zone manager with the address of SCU 1 contained in the message. The zone manager then assumes responsibility for sending the registration message complete with alias and client address to SCU 1. SCU 1 then replies to the zone manager with an acknowledgment containing the address of SCU 1. The zone manager then sends a general acknowledgment message to the client thereby completing the registration process for that alias. This process can be repeated as required for multiple aliases.

The sequence in FIG. 2 labeled "b" can be termed directory registration of an alias since the directory sends the registration message to the SCUs. A registration message containing the alias and client address of the terminal is sent from the client to the zone manager when the terminal is turned on just as above. The zone manager then sends the registration message to the directory. This time the directory forwards the registration message to SCU 2. An acknowledgment message is returned to the directory. The directory inserts the address of SCU 2 into the acknowledgment and sends it on to the zone manager. The zone manager then sends a general acknowledgment back to the client thereby completing the registration process for that alias. Again, this process can be repeated as needed for multiple aliases.

It should be noted that messages which register the client address with the SCU can be omitted. Doing so, however, would require the SCUs to consult with the directory prior to each setup message they send in order to determine the current address of the client. This is the mechanism in use today for cellular networks.

Scenario "c" demonstrates client/terminal registration of multiple aliases in a single registration message using the zone manager alias registration process described in scenario "a". Scenario "c" illustrates two aliases being registered in a single step. However, more aliases could have been included in the registration message if desired. The client sends a registration message containing the two aliases and the client's terminal address to the zone manager. The zone manager sends this registration message on to the directory. The directory determines which SCU serves which alias and returns an acknowledgment to the zone manager containing the addresses of the two SCUs. The zone manager then sends a registration message to each SCU containing the alias for that SCU as determined in the directory as well as the client's terminal address. In this example, the zone manager sends a registration message with alias 1 and the client's terminal address as parameters to SCU 1. SCU 1 responds with an acknowledgment back to the zone manager containing the address of SCU 1. The zone manager also sends a registration message with alias 2 and the client's terminal address as parameters to SCU 2. SCU 2 responds with an acknowledgment back to the zone manager with the address of SCU 2. Once all the SCUs have responded with specific acknowledgments, the zone manager sends a general acknowledgment to the client indicating that all aliases have been registered with their respective SCUs. Alternatively, the zone manager could acknowledge each alias as it receives an acknowledgment from the servicing SCU.

Figure 3:
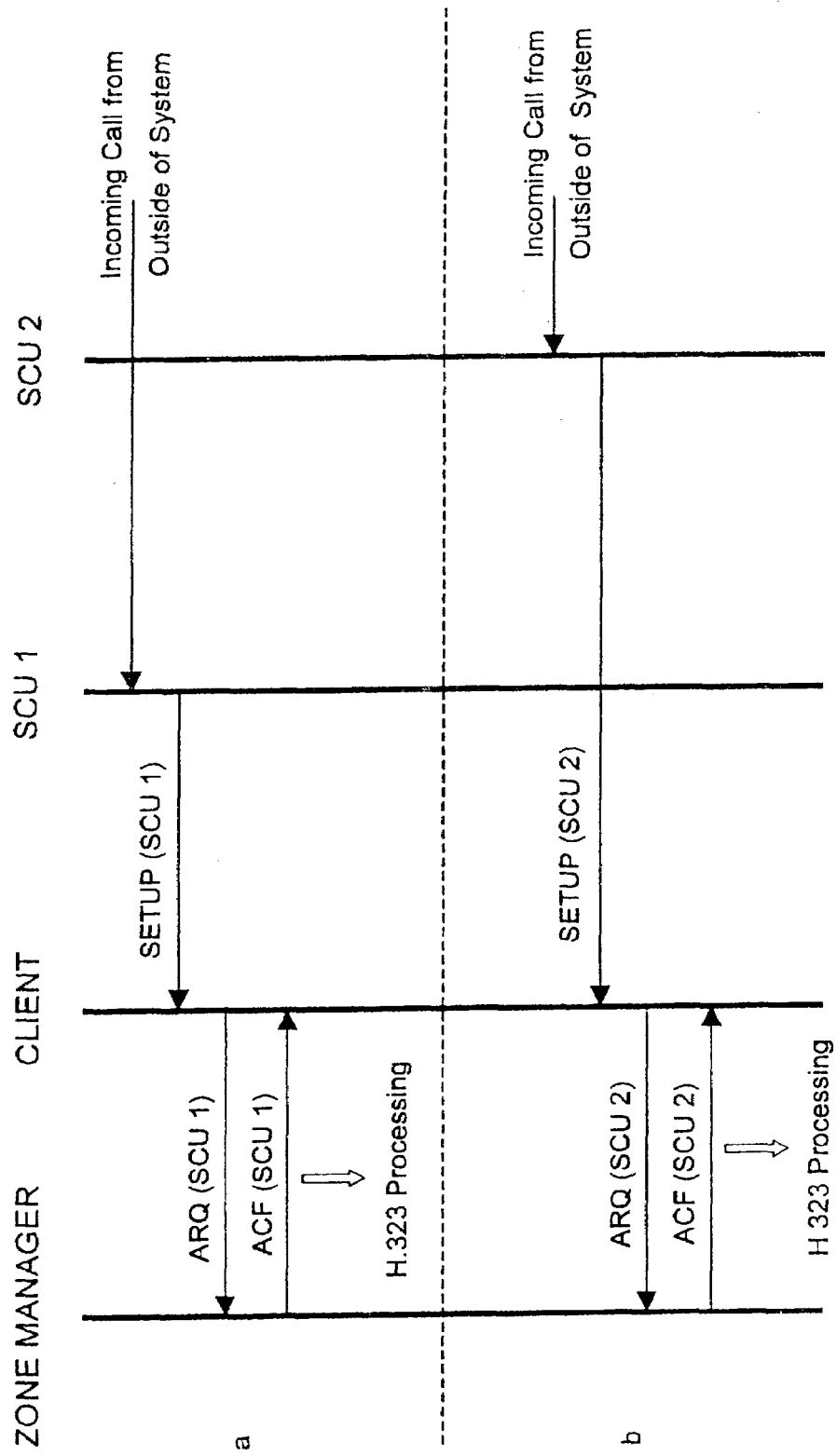
FIG. 3 is a message sequence chart illustrating the messaging involved for an incoming call to a subscriber.

Once a client has registered an alias, incoming and outgoing calls may be handled according to standard call and feature signaling. FIG. 3 is a message sequence chart illustrating the messaging involved for an incoming call to a subscriber's terminal. A call from outside of the system arrives at the appropriate SCU based on standard PSTN routing procedures. The SCU sends a call setup message to the client using the terminal address acquired during registration. The setup message contains SCU information identifying the SCU responsible for processing the call. The client then sends an authorization request (ARQ) message to the client's zone manager. The zone manager replies with an authorization confirmed (ACF) message. The authorization request (ARQ) and authorization confirmed (ACF) messages serve to authenticate the nodes and grant admission to the call on a per call basis. Each message also contains a parameter identifying the address of the responsible SCU based on the specific alias involved. The call is now processed according to standard call and feature signaling. Scenario "b" is identical to scenario "a" except that a different service provider is used for the call due to the fact that the alias used for the call receives services administered by another SCU.

Figure 4:
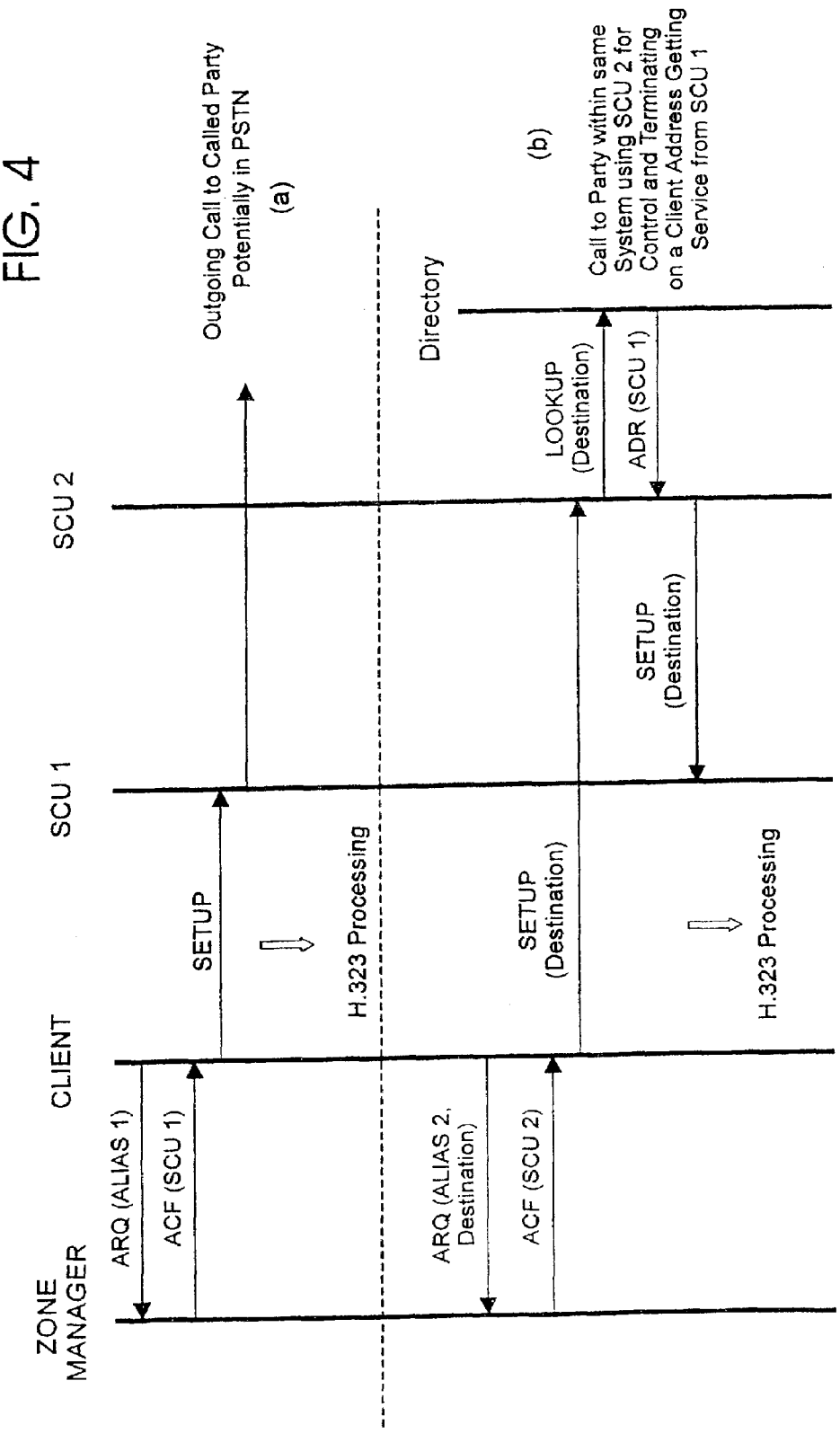
FIG. 4 is a message sequence chart illustrating the messaging involved for an outgoing call from a party and a call to a party within the same multi-SCU system.

FIG. 4 is a message sequence chart illustrating outgoing call processing. Scenario "a" illustrates the messaging involved for an outgoing call to a party potentially in the PSTN. To place this type of outgoing call, an authorization request (ARQ) message is sent from the client to the zone manager containing the alias of the calling terminal. The zone manager responds with an authorization confirmed (ACF) message back to the client including the SCU address of the SCU servicing the call. Upon authentication, a setup message is sent to the proper SCU and the call is placed to the intended party. The call is now processed according to standard call and feature signaling.

Scenario "b" illustrates placing a call to a party within the same system using SCU 2 for control and terminating on a client address that is serviced by SCU 1. The client sends an authorization request message containing its alias and a destination address to the zone manager. The destination address refers to the called party's terminal alias. The zone manager returns an authorization confirmed message having the address of the SCU serving the caller's alias, SCU 2 in this case. A setup message containing the destination address is then sent from the client to SCU 2. SCU 2 then sends a lookup message having the destination address to the directory. The directory locates the appropriate SCU for the destination address and returns an address message containing the address of the appropriate SCU (SCU 1 in this example) to SCU 2. SCU 2 then sends a setup message containing the destination address to SCU 1. At this point the call is handled according to standard call and feature signaling. This scenario highlights the present invention's ability to have an originating SCU utilize the Directory to discover the proper terminating SCU for a call within the same system.

By way of example, consider a terminal having two aliases, namely a home directory number and a work directory number. The home directory number is serviced by the local telephone company's SCU for that area code and exchange. The work number, however, is serviced by a local PBX system acting as an SCU. Thus, when the terminal is turned on, the home directory number (alias 1) registers with the telephone company's SCU while the work directory number (alias 2) registers with the local PBX. Thereafter calls to and from the home directory number are processed by the telephone company's SCU and calls to and from the work directory number are processed by the local PBX. Thus a single client/terminal is serviceable by multiple service providers.

It is to be understood that the present invention illustrated herein is readily implementable by those of ordinary skill in the art as a computer program product having a medium with a computer program embodied thereon. The computer program product is capable of being loaded and executed on the appropriate computer processing device(s) in order to carry out the method or process steps described. Appropriate computer program code in combination with hardware implements many of the elements of the present invention. This computer code is often stored on storage media. This media can be a diskette, hard disk, CD-ROM, or tape. The media can also be a memory storage device or collection of memory storage devices such as read-only memory (ROM) or random access memory (RAM). Additionally, the computer program code can be transferred to the appropriate hardware over some type of data network.

In the following claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The invention claimed is:

1. A telephony system supporting multiple service providers on a per call basis comprising:
   a) a telephone network;
   b) a zone manager communicable with a terminal and said telephone network for managing a registration state of the terminal;
   c) a plurality of service control units (SCUs) operatively connected to said telephone network for providing telephone services to the terminal, each of the SCUs corresponding to respective ones of the multiple service providers; and
   d) a directory connected to said telephone network for maintaining a service subscription profile for the terminal, said service subscription profile corresponding to which SCU provides which services to the terminal.

2. The system of claim 1 in which the telephone network is an IP telephone network.

3. The system of claim 1 in which the telephone network is a wireless telephone network.

4. The system of claim 1 in which the telephone network is a session initiation protocol (SIP) network.

5. A method of using a terminal in a telephony network, comprising:
registering a plurality of aliases for the terminal;
securing a first service from a first service provider using a first one of the plurality of aliases;
securing a second service from a second service provider using a second one of the plurality of aliases;
using one of the plurality of aliases to receive a particular service from a particular service provider based on the securing; and
providing a service subscription profile corresponding to which service provider provides which services to the terminal.

6. The method of claim 5 further comprising maintaining the service subscription profile in a directory.

7. The method of claim 6 further comprising accessing the directory with a zone manager when an incoming or outgoing call commences to determine which service provider is to provide a given service for the incoming or outgoing call.

8. The method of claim 6, wherein the directory stores service control unit addresses for each alias of the plurality of aliases for the terminal.

9. The method of claim 8, wherein the service control unit addresses and the service subscription profile include registration data which is provided to a zone manager.

10. The method of claim 5 further comprising using a zone manager to access the service subscription profile to determine which service provider is to provide a given service for the incoming or outgoing call.

11. The method of claim 5 wherein securing a first service from a first service provider comprises securing a first service from a first service provider over the telephony network.

12. The method of claim 11 wherein securing a first service from a first service provider over the telephony network comprises securing the first service over an IP telephony network.

13. The method of claim 11 wherein securing a first service from a first service provider over the telephony network comprises securing the first service over a wireless telephony network.

14. The method of claim 11 wherein securing a first service from a first service provider over the telephony network comprises securing the first service over a session initiation protocol (SIP) telephony network.

15. A computer readable medium comprising software having instructions for instructing a computer processing device to promote efficient use of a terminal in a telephony network, said software comprising instructions to:
provide a service subscription profile for the terminal in a directory;
store information within the service subscription profile relating to aliases of the terminal; and
store information within the service subscription profile relating to a service provided to the terminal by different services providers based on the alias used by the terminal.

16. The computer readable medium of claim 15 wherein said software further comprises instructions to:
receive an access request from a zone manager to access information from the service subscription profile.

17. The computer readable medium of claim 16 wherein said software receives the access request from a zone manager over the telephony network.

18. The computer readable medium of claim 15 wherein said software is interacted with an IP telephony network.

19. The computer readable medium of claim 15 wherein said software is interacted with a wireless telephony network.

20. The computer readable medium of claim 15 wherein said software is interacted with a session initiation protocol (SIP) telephony network.

21. The computer readable medium of claim 15, wherein the directory stores service control unit addresses for each of the aliases of the terminal.

22. The computer readable medium of claim 21, wherein the service control unit addresses and the service subscription profile include registration data which is provided to a zone manager.

* * * * *